US012801425B2

(12) United States Patent
Harboe

(10) Patent No.: US 12,801,425 B2
(45) Date of Patent: Nov. 17, 2026

(54) PARALLEL PROCESSING ARCHITECTURE WITH SHADOW STATE

(71) Applicant: Ascenium AS, Stavanger (NO)

(72) Inventor: Øyvind Harboe, Stavanger (NO)

(73) Assignee: Ascenium, Inc., Mountain View, CA (US)

( * ) Notice: Subject to any disclaimer, the term of this patent is extended or adjusted under 35 U.S.C. 154(b) by 411 days.

(21) Appl. No.: 18/621,175

(22) Filed: Mar. 29, 2024

(65) Prior Publication Data

US 2024/0330036 A1 Oct. 3, 2024

Related U.S. Application Data

(60) Provisional application No. 63/554,233, filed on Feb. 16, 2024, provisional application No. 63/537,024, filed on Sep. 7, 2023, provisional application No. 63/526,252, filed on Jul. 12, 2023, provisional application No. 63/456,013, filed on Mar. 31, 2023.

(51) Int. Cl.

| | |
|---|---|
| ***G06F 9/44*** | (2018.01) |
| ***G06F 9/38*** | (2018.01) |
| ***G06F 9/46*** | (2006.01) |
| ***G06F 9/48*** | (2006.01) |

(52) U.S. Cl.

CPC ............ *G06F 9/461* (2013.01); *G06F 9/3863* (2013.01); *G06F 9/4812* (2013.01)

(58) Field of Classification Search

CPC ....... G06F 9/461; G06F 9/3863; G06F 9/4812

USPC .......................................................... 718/102

See application file for complete search history.

(56) References Cited

U.S. PATENT DOCUMENTS

| | | | |
|---|---|---|---|
| 7,840,777 | B2 | 11/2010 | Mykland |
| 8,677,081 | B1 | 3/2014 | Wentzlaff et al. |
| 8,856,768 | B2 | 10/2014 | Mykland |
| 8,869,123 | B2 | 10/2014 | Mykland |

(Continued)

FOREIGN PATENT DOCUMENTS

| | | | |
|---|---|---|---|
| KR | 10-2015-0051083 | A | 5/2015 |
| WO | WO2011038940 | A1 | 4/2011 |
| WO | WO2020252763 | A1 | 6/2019 |

OTHER PUBLICATIONS

International Search Report dated Jul. 30, 2024 for PCT/IB2024/000128.

(Continued)

*Primary Examiner* — Timothy A Mudrick

(74) *Attorney, Agent, or Firm* — Adams Intellex, PLC

(57) ABSTRACT

Techniques for task processing within an array of compute elements are disclosed. A two-dimensional (2D) array of compute elements, a control unit, and a memory system are accessed. Each compute element is coupled to its neighboring compute elements and includes a plurality of shadow state registers. A set of directions is provided for compute element operation and memory access precedence. Execution of a compiled task is started. Execution of the compiled task is halted at a point in time. An architectural state is saved at the point of the halting into a shadow SRAM. A bit in the shadow state SRAM representing a portion of the architectural state of the 2D array is set. The architectural state of the 2D array that was altered within the shadow SRAM is restored. Execution of the compiled task is started in the architectural state that was altered.

25 Claims, 7 Drawing Sheets

(56) References Cited

U.S. PATENT DOCUMENTS

| | | | |
|---|---|---|---|
| 8,949,806 | B1 | 2/2015 | Lee et al. |
| 9,158,544 | B2 | 10/2015 | Mykland |
| 9,304,770 | B2 | 4/2016 | Mykland |
| 9,395,992 | B2 | 7/2016 | Doing et al. |
| 9,424,055 | B2 | 8/2016 | Lundvall et al. |
| 9,473,155 | B2 | 10/2016 | Staszewski et al. |
| 9,477,470 | B2 | 10/2016 | Mykland |
| 9,529,715 | B2 | 12/2016 | Kumar et al. |
| 9,582,277 | B2 | 2/2017 | Muff et al. |
| 9,594,559 | B2 | 3/2017 | Fontenot et al. |
| 9,600,287 | B2 | 3/2017 | Gschwind et al. |
| 9,633,160 | B2 | 4/2017 | Mykland |
| 9,652,238 | B2 | 5/2017 | Muff et al. |
| 9,684,511 | B2 | 6/2017 | Shanbhogue et al. |
| 9,830,164 | B2 | 11/2017 | Yazdani |
| 9,851,969 | B2 | 12/2017 | Greiner et al. |
| 9,886,277 | B2 | 2/2018 | Loktyukhin et al. |
| 9,898,293 | B2 | 2/2018 | Whittaker |
| 9,921,836 | B2 | 3/2018 | Kumar et al. |
| 9,928,062 | B2 | 3/2018 | Azagury et al. |
| 9,934,040 | B2 | 4/2018 | Bonanno et al. |
| 9,971,605 | B2 | 5/2018 | Henry et al. |
| 9,977,674 | B2 | 5/2018 | Rupley, II et al. |
| 9,977,675 | B2 | 5/2018 | Nystad |
| 9,977,679 | B2 | 5/2018 | Caulfield et al. |
| 9,983,882 | B2 | 5/2018 | Greiner et al. |
| 9,983,884 | B2 | 5/2018 | Maiyuran et al. |
| 10,089,277 | B2 | 10/2018 | Mykland |
| 10,540,584 | B2 | 1/2020 | McBride et al. |
| 10,922,146 | B1 | 2/2021 | Minkin et al. |
| 11,163,486 | B2 | 11/2021 | Bavishi et al. |
| 2002/0174318 | A1 | 11/2002 | Studdard et al. |
| 2013/0326190 | A1 | 12/2013 | Chung et al. |
| 2014/0149657 | A1 | 5/2014 | Jakovljevic et al. |
| 2014/0317383 | A1 | 10/2014 | Park et al. |
| 2015/0186146 | A1 | 7/2015 | Kushida et al. |
| 2016/0246602 | A1 | 8/2016 | Radhika et al. |
| 2017/0083431 | A1* | 3/2017 | Burger .................... G06F 11/36 |
| 2018/0225116 | A1 | 8/2018 | Henry et al. |
| 2018/0307980 | A1 | 10/2018 | Barik et al. |
| 2018/0322606 | A1 | 11/2018 | Das et al. |
| 2018/0341493 | A1 | 11/2018 | Roy et al. |
| 2019/0004777 | A1 | 1/2019 | Meixner |
| 2019/0347190 | A1 | 11/2019 | Singh |
| 2019/0369990 | A1 | 12/2019 | Doerr et al. |
| 2020/0026498 | A1 | 1/2020 | Sumbul et al. |
| 2020/0241879 | A1 | 7/2020 | Vorbach et al. |
| 2022/0050624 | A1 | 2/2022 | Bavishi et al. |
| 2022/0075740 | A1* | 3/2022 | Foley .................. G06F 13/1668 |
| 2022/0308872 | A1* | 9/2022 | Foley .................... G06F 9/5038 |

OTHER PUBLICATIONS

Chang, Kyungwook, and Kiyoung Choi. "Mapping control intensive kernels onto coarse-grained reconfigurable array architecture." 2008 International SoC Design Conference. vol. 1. IEEE, 2008.

* cited by examiner

PARALLEL PROCESSING ARCHITECTURE WITH SHADOW STATE

RELATED APPLICATIONS

This application claims the benefit of U.S. provisional patent applications "Parallel Processing Architecture With Shadow State" Ser. No. 63/456,013, filed Mar. 31, 2023, "Parallel Architecture With Compiler-Scheduled Compute Slices" Ser. No. 63/526,252, filed Jul. 12, 2023, "Semantic Ordering For Parallel Architecture With Compute Slices" Ser. No. 63/537,024, filed Sep. 7, 2023, and "Compiler Generated Hyperblocks In A Parallel Architecture With Compute Slices" Ser. No. 63/554,233, filed Feb. 16, 2024.

Each of the foregoing applications is hereby incorporated by reference in its entirety.

FIELD OF ART

This application relates generally to parallel processing and more particularly to a parallel processing architecture with a shadow state.

BACKGROUND

The amount of data generated on a daily basis continues to grow. The term "big data" refers to extremely large and complex data sets that cannot be processed by traditional data processing techniques. The sources of data can include structured data, which is data that is well organized and easily searchable in databases. Examples include sales transactions, financial records, and customer data. Data sources can also include unstructured data. This can include data that is not easily searchable or organized, and can include text, images, audio and video files, social media posts, and so on. Examples include emails, social media updates, blog posts, and customer reviews. The data sources can include semi-structured data. This is data that has some organizational structure, but does not fit neatly into a traditional database. Examples include web logs, sensor data, and machine data.

The advent of the Internet-of-Things (IoT) has enabled collection of very large amounts of data. This data can include environmental data for measuring temperature, humidity, and other environmental factors. IoT sensors can be used for health applications, including the monitoring of vital signs such as heart rate, blood pressure, respiratory rate, and so on. This data can be used to monitor the health of patients in hospitals or elderly individuals living independently at home. IoT sensors can also be used to track the location of assets such as vehicles, equipment, and products as they move through the supply chain. This data can be used to optimize logistics and reduce transportation costs. Regardless of the source or nature of the data, data processing continues to be an important aspect of analyzing, and thus, obtaining benefits from, the data that is collected. The data that is collected can be used to optimize processes, reduce costs, and improve efficiency in a variety of industries and applications.

Techniques for processing large amounts of data include parallel processing. Parallel processing is a type of computing in which multiple processors or computers work together to perform a task. Rather than having one processor or computer handle all of the work, the task is divided into smaller, more manageable parts that can be completed simultaneously by different processors or computers. A main benefit of parallel processing is increased throughput. Parallel processing can significantly accelerate the time it takes to complete a task. By dividing a task into smaller parts that can be completed simultaneously, the overall processing time is reduced. Additionally, parallel processing allows for more efficient use of resources. By using multiple processors to work on a task, each individual processor can focus on a specific part of the task, which can increase efficiency. Parallel processing can also improve scalability, meaning it can handle larger amounts of data or more complex tasks. As the amount of data or complexity of a task increases, more processors can be added to the parallel processing system to handle the workload. As technologies improve and new services are enabled, the amount of global data available will continue to increase in the future.

SUMMARY

Applications that require intense computation, large amounts of data, and repetitive or independent tasks are well suited for parallel processing. Analyzing large data sets requires significant computational power, and parallel processing can be used to expedite data processing and analysis. Parallel processing can be used for tasks such as data cleaning, data integration, data transformation, and data analysis. Machine learning algorithms require large amounts of data and extensive computation, which can be time consuming and resource intensive. Parallel processing can be used to speed up the training process and improve model accuracy. Image and video processing tasks such as image recognition, object detection, and video analysis require significant computation, and parallel processing can be used to expedite these tasks. Parallel processing can be used to distribute the processing of individual frames or sections of images and videos across multiple processors. Simulation and modeling tasks in fields such as physics, engineering, and finance require significant computation, and parallel processing can be used to perform these simulations and modeling tasks in an efficient manner. Parallel processing can be used to simulate multiple scenarios simultaneously, or to perform multiple simulations with different parameters. Computer-generated imagery (CGI) is used for making educational videos, documentaries, and television programs, as well as full-length movies for entertainment. Parallel processing can greatly reduce the amount of time required to render the frames used to create such videos. Overall, any application that requires significant computational power or processes large amounts of data can benefit from parallel processing. Parallel processing can help improve processing speed, can reduce computation time, and can improve the efficiency of data analysis and processing tasks.

Techniques for task processing within an array of compute elements are disclosed. A two-dimensional (2D) array of compute elements, a control unit, and a memory system are accessed. Each compute element is coupled to its neighboring compute elements and includes a plurality of shadow state registers. A set of directions is provided for compute element operation and memory access precedence. Execution of a compiled task is started. Execution of the compiled task is halted at a point in time. An architectural state is saved at the point of the halting into a shadow SRAM. A bit in the shadow state SRAM representing a portion of the architectural state of the 2D array is set. The architectural state of the 2D array that was altered within the shadow SRAM is restored. Execution of the compiled task is started in the architectural state that was altered.

A processor-implemented method for task processing is disclosed comprising: accessing a processing unit comprising a two-dimensional (2D) array of compute elements, a control unit, and a memory system, wherein each compute element within the 2D array of compute elements is known to a compiler and is coupled to its neighboring compute elements within the 2D array of compute elements, and wherein the control unit, memory system, and each compute element within the 2D array of compute elements includes a plurality of shadow state registers; providing a set of directions to the 2D array, through a control word generated by the compiler, for compute element operation and memory access precedence; starting execution of a compiled task on the 2D array, based on the set of directions, wherein the set of directions enables the 2D array to properly sequence compute element results; halting execution of the compiled task at a point in time; saving an architectural state, at the point of the halting, of the 2D array into a shadow SRAM; altering, within the shadow SRAM, a bit representing a portion of the architectural state of the 2D array; restoring, to the 2D array, the architectural state of the 2D array that was altered within the shadow SRAM; and restarting execution of the compiled task in the architectural state that was altered. In embodiments, the altering further comprises determining an address, within the shadow SRAM, of specific shadow information. Some embodiments comprise computing a length of a shadow ring bus, wherein the computing is based on an instrumented RTL model of the processing unit with at least one observation port. In embodiments, a width of the shadow ring bus is based on switch latency. And in embodiments, the shadow SRAM is comprised of a number of rows equivalent to a length of the shadow ring bus.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
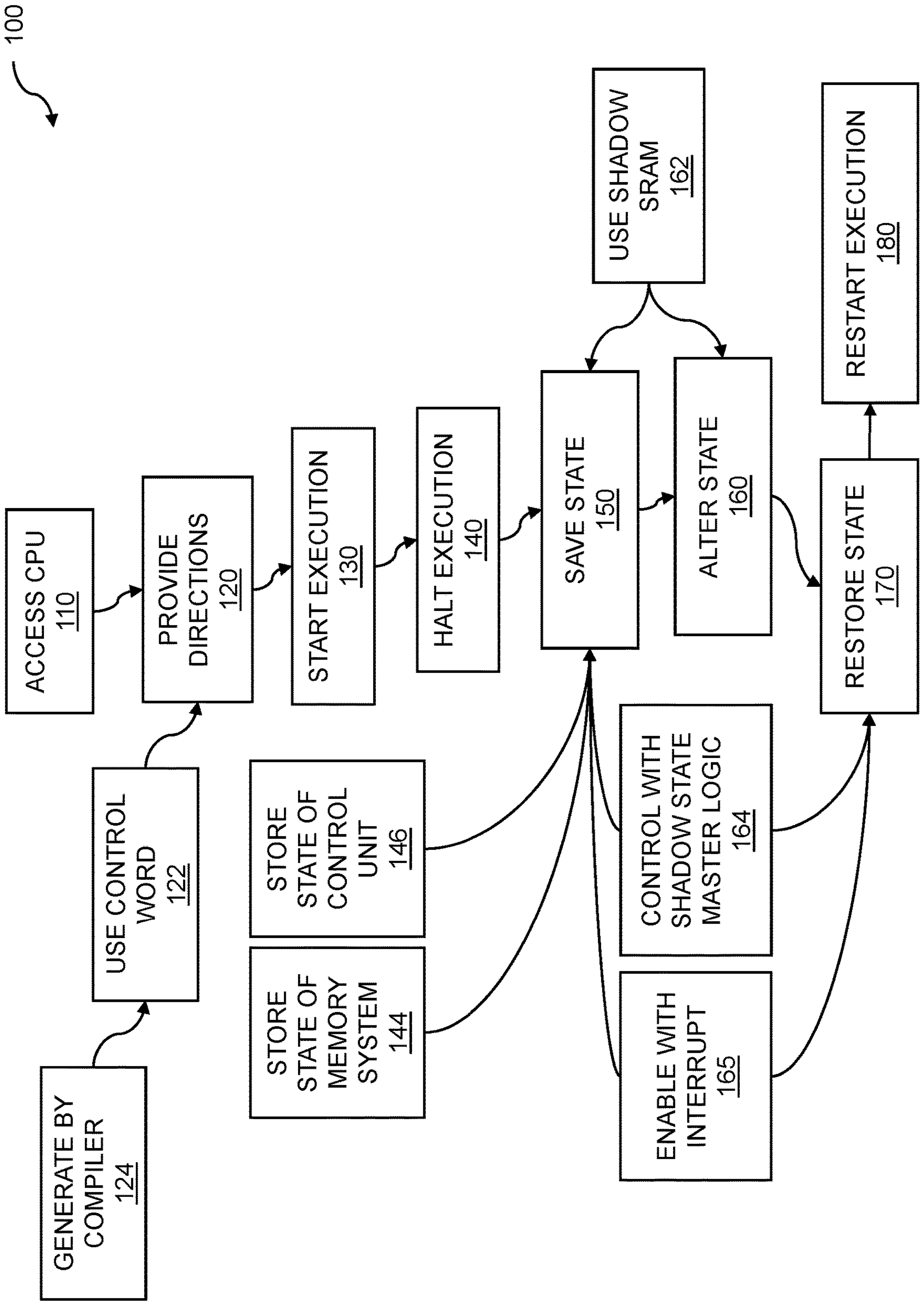
FIG. 1 is a flow diagram for a parallel processing architecture with a shadow state.

In general, context switching involves saving the current state of the processor, such as the program counter, registers, and other relevant data, onto the stack, and then loading the next context (e.g., of the interrupt handler) onto the processor. Once the interrupt handler has completed its task, the processor restores the saved context from the stack and resumes the execution of the interrupted task. In the case of a two-dimensional (2D) array of compute elements, the complexity of the context switch can increase significantly.

Complex programs can require context switching for efficient execution. A context switch is a mechanism used by computer systems to handle interrupts generated by external sources such as Input/Output (I/O) signals, as well as internal, software-based conditions such as exceptions. An interrupt is a signal generated to request the attention of the processor to perform a specific task. When an interrupt occurs, the processor needs to quickly stop the current task it is performing and switch to the context of the interrupt handler to perform the necessary task. The interrupt handler is a software routine that is designed to handle the specific type of interrupt and perform the required task.

Interrupt context switching is a critical mechanism for handling interrupts in modern computer systems. Fast interrupt context switching is important because it enables a computer system to quickly respond to events such as interrupts, which can occur at any time during the execution of a program. Interrupts are signals generated by hardware devices such as timers, disk drives, or I/O signals, to request the attention of the processor to perform a specific task. For systems that are a collection of compute elements operating in parallel on a specific task, handling a context switch can be very complex.

Fast and efficient interrupt context switching is important because it enables a computer system to quickly respond to interrupts and perform the necessary tasks, without causing significant delays or interrupting the normal operation of the system. This is particularly important in real-time systems, where delays caused by interrupt handling can have serious consequences. Another prevalent issue is the development of applications for a two-dimensional (2D) array of compute elements. Debugging applications and tasks executing on a two-dimensional (2D) array of compute elements is non-trivial and creates numerous challenges. This can make it difficult to reproduce and isolate program defects (bugs). Debugging such issues can be difficult, especially if the problem occurs sporadically or only under specific conditions.

Disclosed embodiments provide techniques to enable efficient context switching for a 2D array of compute elements, and also provide features and techniques that can enable saving off to a shadow SRAM, and altering the architectural state of the 2D array of compute elements. The altered architectural state can be loaded back into the 2D array of compute elements from the shadow SRAM to continue execution. This enables debugging features for the 2D array of compute elements, such as reading and altering registers and/or memory contents. The 2D array of compute elements can be halted, and the architectural state can be saved. This feature enables program verification and debugging of the 2D array of compute elements. Furthermore, this feature is used to implement operating system support for full context switches as well as launching processes.

Techniques for task processing are disclosed. A processing unit comprising a two-dimensional (2D) array of compute elements is obtained. A set of directions is provided to the 2D array, through a control word generated by the compiler, for compute element operation and memory access precedence. Execution of a compiled task on the 2D array is started, based on the set of directions, wherein the set of directions enables the 2D array to properly sequence compute element results. Then, execution of the compiled task is halted at a point in time. The architectural state, at the point of the halting of the 2D array, is saved into a shadow SRAM. A bit representing a portion of the architectural state of the 2D array is altered within the shadow SRAM. Then, the architectural state of the 2D array that was altered within the shadow SRAM is restored to the 2D array, and the execution of the compiled task is restarted in the architectural state that was altered.

FIG. 1 is a flow diagram for a parallel processing architecture with a shadow state. Groupings of compute elements (CEs), such as CEs assembled within an array of CEs, can be configured to execute a variety of operations associated with data processing. The operations can be based on tasks, and on subtasks that are associated with the tasks. The array can further interface with other elements such as controllers, storage elements, ALUs, memory management units (MMUs), GPUs, multiplier elements, and so on. The operations can accomplish a variety of processing objectives such as application processing, data manipulation, data analysis, and so on. The operations can manipulate a variety of data types including integer, real, floating-point, and character data types; vectors and matrices; tensors; etc. Control is provided to the array of compute elements on a cycle-by-cycle basis, where the control is based on wide control words generated by a compiler. The control words, which can include microcode control words, enable or idle various compute elements; provide data; route results between or among CEs, caches, and storage; and the like. The control enables compute element operation, memory access precedence, etc. Compute element operation and memory access precedence enable the hardware to properly sequence data provision and compute element results. The control enables execution of a compiled program on the array of compute elements.

The flow 100 includes accessing an array 110 of compute elements, wherein each compute element within the array of compute elements is known to a compiler and is coupled to its neighboring compute elements within the array of compute elements. The compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can be arranged in pairs, quads, and so on, and can share resources within the arrangement. The compute elements can include heterogeneous compute resources, where the heterogeneous compute resources may or may not be colocated within a single integrated circuit or chip. The compute elements can be configured in a topology, where the topology can be built into the array, programmed or configured within the array, etc. In embodiments, the array of compute elements is configured by a control word that can implement a topology. The topology that can be implemented can include one or more of a systolic, vector, cyclic, spatial, streaming, or Very Long Instruction Word (VLIW) topology. In embodiments, the array of compute elements can include a two-dimensional (2D) array of compute elements. More than one 2D array of compute elements can be accessed. Two or more arrays of compute elements can be colocated on an integrated circuit or chip, on multiple chips, and the like. In embodiments, two or more arrays of compute elements can be stacked to form a three-dimensional (3D) array. The stacking of the arrays of compute elements can be accomplished using a variety of techniques. In embodiments, the three-dimensional (3D) array can be physically stacked. The 3D array can comprise a 3D integrated circuit. In other embodiments, the three-dimensional array is logically stacked. The logical stacking can include configuring two or more arrays of compute elements to operate as if they were physically stacked.

The compute elements can further include a topology suited to machine learning computation. A topology for machine learning can include supervised learning, unsupervised learning, reinforcement learning, and other machine learning topologies. A topology for machine learning can include an artificial neural network topology. The compute elements can be coupled to other elements within the array of CEs. In embodiments, the coupling of the compute elements can enable one or more further topologies. The other elements to which the CEs can be coupled can include storage elements such as a scratchpad memory, one or more levels of cache storage, control units, multiplier units, address generator units for generating load (LD) and store (ST) addresses, buffers, register files, and so on. The compiler to which each compute element is known can include a compiler for any programming language such as C, C++, Python, and so on. The compiler to which each compute element is known can include a compiler written especially for the array of compute elements. The coupling of each CE to its neighboring CEs enables clustering of compute resources; sharing of array elements such as cache elements, multiplier elements, ALU elements, or control elements; communication between or among neighboring CEs; and the like.

The flow 100 includes providing directions 120 for the compute elements on a cycle-by-cycle basis. The directions can include configuration of elements such as compute elements within the array; loading and storing data; routing data to, from, and among compute elements; and so on. A cycle can include a clock cycle, an architectural cycle, a system cycle, a self-timed cycle, and the like. The directions can be delivered by a stream of control words 122 that are generated and provided by a compiler 124. The control words can include microcode control words, compressed control words, encoded control words, and the like. The "wideness" or width of the control words allows a plurality of compute elements within the array of compute elements to be controlled by a single wide control word. For example, an entire row of compute elements can be controlled by that wide control word. In embodiments, the stream of wide control words can include variable length control words generated by the compiler. The control words can be decompressed, used, etc., to configure the compute elements and other elements within the array; to enable or disable individual compute elements, rows and/or columns of compute elements; to load and store data; to route data to, from, and among compute elements; and so on. In other embodiments, the stream of wide control words generated by the compiler can provide direct, fine-grained control of the array of compute elements. The fine-grained control of the compute elements can include enabling or idling individual compute elements; enabling or idling rows or columns of compute elements; etc.

The compiler 124 can include a general-purpose compiler such as a C, C++, Java, or Python compiler; a hardware description language compiler such as a VHDL or Verilog compiler; a compiler written for the array of compute elements; and the like. In embodiments, the control words comprise compressed control words, variable length control words, and the like. In embodiments, the stream of control words generated by the compiler can provide direct fine-grained control of the 2D array of compute elements. The compiler can be used to map functionality to the array of compute elements. In embodiments, the compiler can map machine learning functionality to the array of compute elements. The machine learning can be based on a machine learning (ML) network, a deep learning (DL) network, a support vector machine (SVM), etc. In embodiments, the machine learning functionality can include a neural network (NN) implementation. The neural network implementation can include a plurality of layers, where the layers can include one or more of input layers, hidden layers, output layers, and the like. A control word generated by the compiler can be used to configure one or more CEs, to enable data to flow to or from the CE, to configure the CE to perform an operation, and so on.

Data processing that can be performed by the array of compute elements can be accomplished by executing tasks, subtasks, and so on. The tasks and subtasks can be represented by control words, where the control words configure and control compute elements within the array of compute elements. The control words comprise one or more operations, where the operations can include data load and store operations; data manipulation operations such as arithmetic, logical, matrix, and tensor operations; and so on. The control words can be compressed by the compiler, by a compressor, and the like. The plurality of wide control words enables compute element operation. Compute element operations can include arithmetic operations such as addition, subtraction, multiplication, and division; logical operations such as AND, OR, NAND, NOR, XOR, XNOR, and NOT; matrix operations such as dot product and cross product operations; tensor operations such as tensor product, inner tensor product, and outer tensor product; etc. The control words can comprise one or more fields. The fields can include one or more of an operation, a tag, data, and so on. In embodiments, a field of a control word in the plurality of control words can signify a "repeat last operation" control word. The repeat last operation control word can include a number of operations to repeat, a number of times to repeat the operations, etc. The plurality of control words enables compute element memory access. Memory access can include access to local storage such as one or more register files or scratchpad storage, memory coupled to a compute element, storage shared by two or more compute elements, cache memory such as level 1 (L1), level 2 (L2), and level 3 (L3) cache memory, a memory system, etc. The memory access can include loading data, storing data, and the like.

The flow includes starting execution 130 for an array of compute elements. The starting of the execution can include fetching a compressed control word. The control word can be decompressed and applied to the 2D array of compute elements. The flow continues with halting execution 140. The halting occurs at some later time than the starting execution 130. The halting can occur anywhere from microseconds after the starting, to many minutes after the starting, depending on the execution of the task/program.

The flow continues with saving the architectural state 150 of the array of compute elements. The architectural state can include the values of registers and/or memory contents within each compute element within the array. Additionally, the flow can include saving the state of other subsystems as part of the architectural state. This can include storing the state of the memory system 144, and/or storing the state of the control unit 146. The memory system can include local storage such as one or more register files or scratchpad storage, memory coupled to a compute element, storage shared by two or more compute elements, cache memory such as level 1 (L1), level 2 (L2), and level 3 (L3) cache memory, and so on. The control unit can control the compute elements of the array via control words. The control unit can use control words to enable or idle rows and/or columns of compute elements, to enable or idle rows individual compute elements, to transmit control words to individual compute elements, etc.

The saving the architectural state 150 includes saving the architectural state to a shadow SRAM 162. In embodiments, a shadow ring bus couples the shadow SRAM to the various elements that contribute to the architectural state, including, but not limited to, the array of compute elements, memory system, control unit, input/output systems, and/or other elements within the system. Once the architectural state is saved, the flow continues with altering the architectural state 160. The altering can include changing the state of at least one bit within the shadow SRAM 162. The state can include changing the state of a bit from a logical 1 to a logical 0, or changing the state of the bit from a logical 0 to a logical 1. The changing of architectural state can include changing the contents of registers and/or memory. This can include changing values of loop indexes, altering the output of logical evaluations, altering the destination of branch statements, and so on. These features provide essential tools for development and debugging of applications for arrays of compute elements.

Embodiments can include controlling the saving and restoring with a shadow state master logic 164. The shadow state master logic can control saving and restoring of the shadow state and this logic is coupled to the shadow state memory (shadow SRAM). Embodiments can include enabling the saving and restoring with an interrupt 165. The interrupt can be a software interrupt, such as an interrupt generated due to a programmatic exception (e.g., divide by zero). Alternatively, the interrupt can be a hardware interrupt, such as a change in a signal state from an onboard element (e.g., control unit), and/or an external source (host computer, external input, etc.).

The flow includes restoring the architectural state 170. The restored architectural state can be altered from the architectural state that was saved at 150. The restoring can include transferring information from the shadow SRAM to the compute element array, the memory system, the control unit, and/or other elements of the overall system. The flow continues with restarting execution 180. The execution then continues using the architectural state that was altered at 160.

Disclosed embodiments can utilize RTL (Register Transfer Level) code to design and implement digital circuits that can be synthesized into a hardware implementation that includes an array of processing elements, a control unit, a memory unit, and/or other elements. Other elements can include, but are not limited to, a memory arbitration unit, a data cache, a memory interface unit, a shadow ring bus, the shadow SRAM, and a host controller interface (e.g., PCIe interface). The code is then used by synthesis tools to automatically generate a gate-level implementation of the circuit, which can be used in the fabrication of disclosed embodiments as an integrated circuit, such as an SoC (system-on-chip).

In order to support the collection and manipulation of shadow state data, disclosed embodiments use techniques to correlate the location of data in the compute array with a corresponding location in the shadow SRAM. This can include simulating the instrumented RTL model, wherein the simulating includes placing one or more tracer values into the shadow ring bus. For example, this technique can determine that data from the Xth compute element in the Yth row of the array of compute elements gets transferred to the Zth row of the shadow SRAM during a save of an architectural state. Similarly, the technique can determine that data modified in the Zth row of the shadow SRAM is transferred back to the Xth compute element in the Yth row of the array of compute elements during a restore of an architectural state. The correlation information that maps compute elements to shadow SRAM locations can be obtained and used in a compiler configuration. The architectural state is altered by editing contents of the shadow SRAM, and based on the compiler configuration, it can then be known which compute elements are altered when the architectural state is restored from the shadow SRAM. Embodiments utilize trace values and RTL simulation observation ports to determine the correlation between compute elements and shadow SRAM locations.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
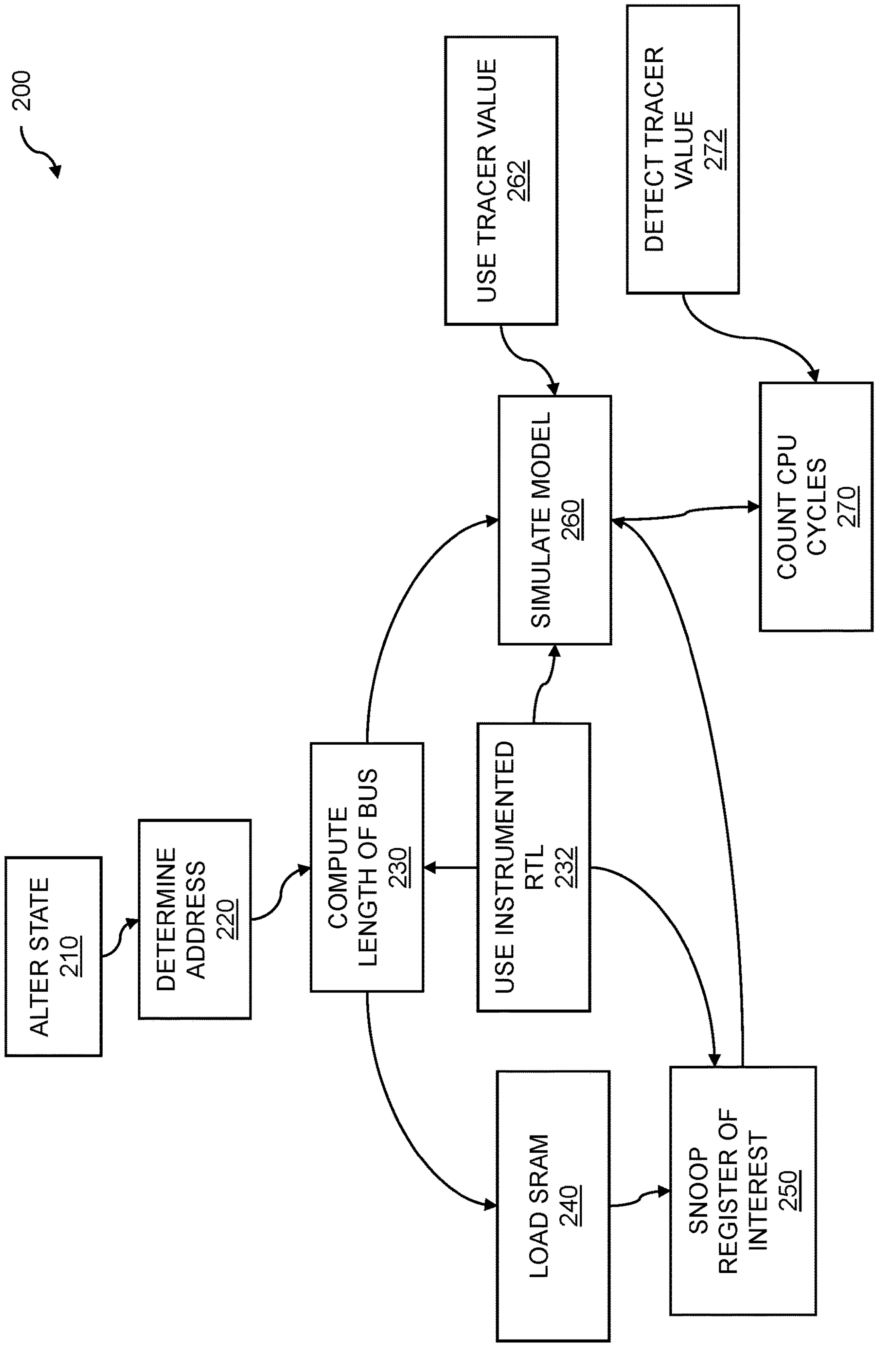
FIG. 2 is a flow diagram for addressing shadow state data.

FIG. 2 is a flow diagram 200 for addressing shadow state data. The flow includes altering the architectural state 210. This includes changing the state of at least one bit in the shadow SRAM. In embodiments, the altering further comprises determining an address, within the shadow SRAM, of specific shadow information. The flow includes determining the address 220 of the shadow SRAM memory location(s) that are altered. The address can be a 32-bit address, 64-bit address, or other suitable size. The flow continues with computing the length of the bus 230. The bus serves to couple the array of compute elements to the shadow SRAM, which enables the saving and restoring of architectural states. The flow can include using instrumented RTL (Register Transfer Level) 232 code.

RTL (Register Transfer Level) code is a type of hardware description language (HDL) used in digital logic design to describe the behavior of digital circuits at the register-transfer level. In embodiments, RTL code describes the behavior of a circuit which includes an array of compute elements in terms of a set of registers and the operations that are performed on them. The registers can be used to store data and control signals within the circuit. The RTL code can be synthesized into a hardware implementation, which can then be translated into a netlist or a gate-level description of the circuit. The RTL code can be used to specify the behavior of an integrated circuit that includes an array of compute elements, including the timing of the operations that are performed. The RTL code is then used by synthesis tools to automatically generate a gate-level implementation of the circuit, which can be used in the fabrication of integrated circuits. In embodiments, the process also includes correlating architectural state data to shadow SRAM locations using trace values and snooping.

Embodiments can include computing the length of a shadow ring bus, wherein the computing is based on an instrumented RTL model of the processing unit with at least one observation port. The flow can include loading SRAM 240. The SRAM can be loaded with an architectural state from an array of compute elements. The flow can further include snooping a register of interest 250. Embodiments can include, snooping, in the instrumented RTL model, a register of interest, wherein the snooping reveals the unique data value that was loaded corresponding to a row in the shadow SRAM. In embodiments, the snooping can include performing a simulation of a model 260. The simulation can include using a tracer value 262. In embodiments, the tracer value 262 can include a single bit value. In some embodiments, the tracer value 262 can include a data signature. The data signature can be based on a row number of the shadow SRAM, an index of a compute element, and/or other parameters. The flow can include counting a number of CPU cycles 270. Embodiments can include counting a number of cycles until the one or more tracer values are detected in the at least one observation port. The flow can include detecting the tracer value 272. The tracer value can be a single bit value. In embodiments, single bit values are detected using a sequence of values and snooping the sequence.

In disclosed embodiments, the length of the shadow ring bus is determined in an initial simulation stage in which the shadow SRAM is unconnected prior to address termination. Then, data values are sent into the bus via a scan chain and a number of clock cycles are observed until they arrive at the end of the scan chain where the shadow SRAM is to be connected. Once the length of the scan chain is known, to determine location of specific registers in the shadow SRAM, unique data can be written into each row of the SRAM. Then, the SRAM can be scanned into the shadow registers and the state of the simulation can be switched to the shadow state. By observing the unique data as signals in simulation, register addresses can be determined. This procedure enables determination of the location of bits in the shadow SRAM that allows the efficient saving, altering, and restoring of architectural states.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
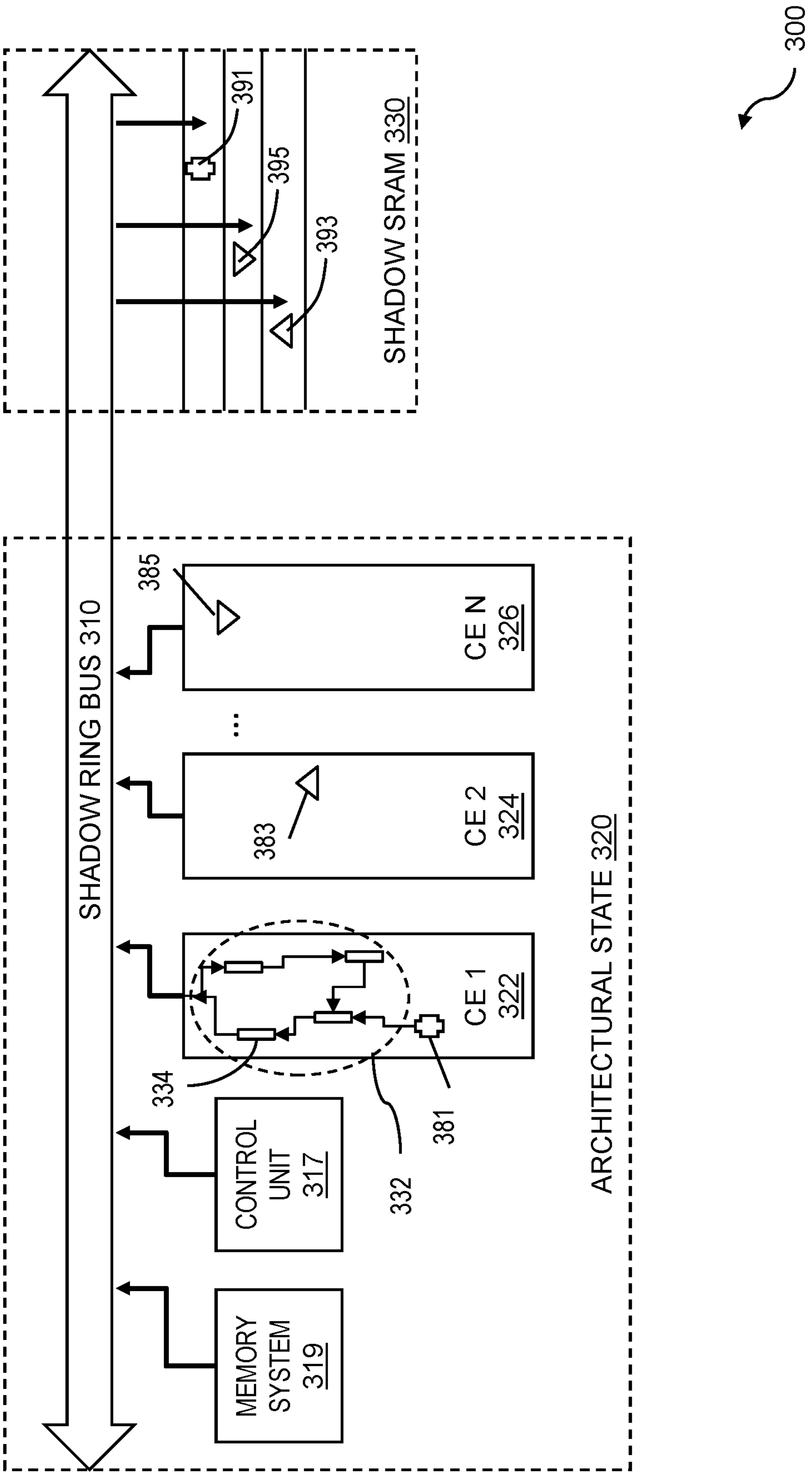
FIG. 3 is a diagram for a shadow ring bus with scan chains.

FIG. 3 is a diagram 300 for a shadow ring bus with scan chains. In the diagram 300, a plurality of compute elements, indicated as CE 1 322, CE 2 324, and CE N 326, are shown. While three compute elements are shown in FIG. 3, in practice, there can be many more compute elements. In some embodiments, there can be hundreds of compute elements. The compute elements can be arranged in a topology. The topology can include a 2D mesh, a 2D fabric, a multidimensional array, a multidimensional hypercube, or another suitable topology. An architectural state 320 includes the state of the compute elements, as well as any other supporting elements such as control unit 317, memory system 319, and/or other subsystems or caches. Each compute element and/or other subsystem or cache can include scan chains 332 to capture its architectural state.

A scan chain is a technique used in digital logic design to simplify the testing and verification of integrated circuits (ICs), such as a compute element, or any supporting element, such as a control unit 317, memory system 319, and/or other subsystems or caches. It can include a series of interconnected flip-flops 334 that capture and propagate data serially through the logic within the IC. In a scan chain 332, each flip-flop 334 is connected to the output of the previous flip-flop, creating a chain of flip-flops. The input to the first flip-flop and the output of the last flip-flop can be connected to external pins on the IC, allowing data to be shifted into and out of the scan chain. In embodiments, the input of the first flip-flop and the output of the last flip-flop can be connected to a shadow ring bus 310, which carries the architectural state of the plurality of compute elements and supporting elements back and forth between the shadow SRAM 330. In embodiments, the shadow ring bus implements a scan function. The contents on the shadow ring bus can be scanned into the shadow SRAM. Thus, the architectural state of the compute elements can be saved. In embodiments, the saving further comprises storing an architectural state of the control unit. In some embodiments, the saving further comprises storing an architectural state of the memory system. In further embodiments, the architectural state 320, once transferred to the shadow SRAM 330, can be altered and/or restored. The state of the shadow SRAM can then be restored back to the architectural state 320. The altering and restoring can include the architectural state of the memory system. Furthermore, the altering and restoring can include the architectural state of the control unit. During testing and verification, a scan function can use one or more scan chains to set the internal state of the IC to a specific configuration, and then capture the output of the IC for analysis. The behavior of the scan chains can also be simulated, allowing scan chain analysis to occur without the need for a physical IC. The scan chains enable disclosed embodiments to be tested in a known state, rather than relying on complex input sequences to achieve a desired state. In embodiments, this includes tracking data from the architectural state 320 to its corresponding location in the shadow SRAM 330.

In the diagram 300, CE 1 322 has associated data 381. The associated data can be located in one or more registers, onboard memory, cache, etc. Similarly, CE 2 324 has associated data 383 and CE N 326 has associated data 385. The data 381, 383, and 385 are copied to corresponding rows and/or locations in the shadow SRAM 330. The data 381 is copied to location 391 in the shadow SRAM 330 via the shadow ring bus. Similarly, the data 383 is copied to location 393 in the shadow SRAM 330, and the data 385 is compiled to the location 395 in shadow SRAM 330. Each location in shadow SRAM 330 is mapped to a corresponding register/memory location within the architectural state 320. The specific mapping can be based on the output of the RTL synthesis of logic within the compute elements or other structures. The order in which the data is stored in the shadow SRAM may or may not correspond to the order of the compute elements in the array. In embodiments, this mapping is provided as a configuration to a compiler. The configuration enables the compiler to generate control words and/or instructions for modifying the architectural state data that resides in the shadow SRAM 330 after a save operation such as shown at 150 in FIG. 1. In embodiments, the shadow state master logic is coupled to the plurality of shadow state registers via a shadow ring bus. In embodiments, the shadow SRAM is comprised of a number of rows equivalent to a length of the shadow ring bus.

Figure 4:
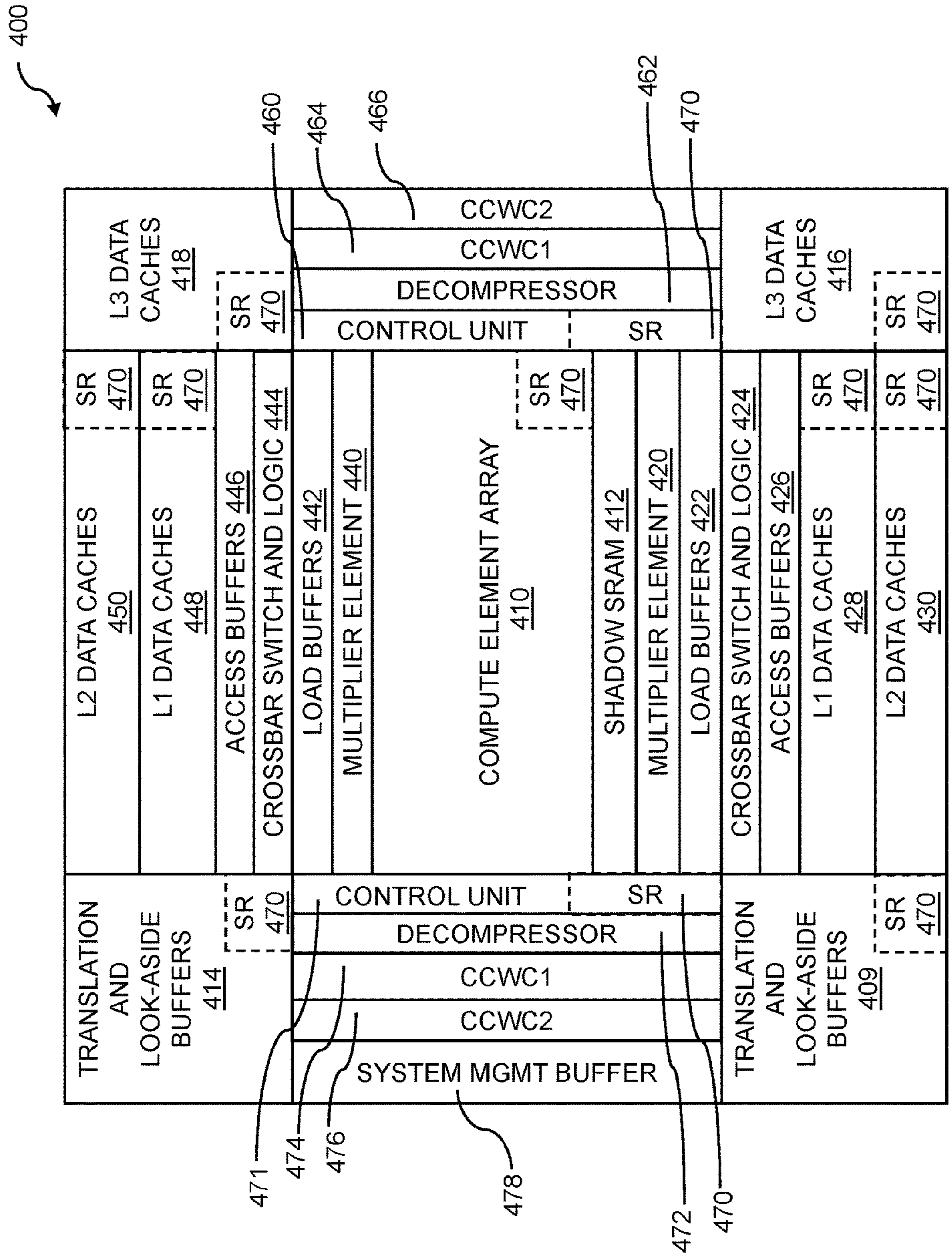
FIG. 4 is a system diagram for a parallel architecture with shadow state registers.

FIG. 4 is a system block diagram for a parallel architecture with shadow state registers. The parallel architecture can comprise a variety of components such as compute elements, processing elements, buffers, one or more levels of cache storage, system management, arithmetic logic units, multipliers, memory management units, and so on. The various components can be used to accomplish parallel processing of tasks, subtasks, and the like. The parallel processing is associated with program execution, job processing, etc. The parallel processing is enabled based on parallel processing using switch block execution. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. A plurality of compute elements within the array of compute elements is initialized with a switch block command, wherein the switch block command is mapped into a primitive operation in each element of the plurality of compute elements, and wherein the initializing is based on a control word from the stream of control words. Each of the primitive operations is executed in an architectural cycle. A result for the switch block command is returned, wherein the returning is gated by a decision variable.

The system block diagram 400 can include a compute element array 410. The compute element array 410 can be based on compute elements, where the compute elements can include processors, central processing units (CPUs), graphics processing units (GPUs), coprocessors, and so on. The compute elements can be based on processing cores configured within chips such as application specific integrated circuits (ASICs), processing cores programmed into programmable chips such as field programmable gate arrays (FPGAs), and so on. The compute elements can comprise a homogeneous array of compute elements. The system block diagram 400 can include translation and look-aside buffers such as translation and look-aside buffers 409 and 414. The translation and look-aside buffers can comprise memory caches, where the memory caches can be used to reduce storage access times.

The system block diagram 400 can include logic for load and store access order and selection. The logic for load and store access order and selection can include crossbar switch and logic 424 along with crossbar switch and logic 444. Switch and logic 424 can accomplish load and store access order and selection for the lower data cache blocks (428 and 430), and switch and logic 444 can accomplish load and store access order and selection for the upper data cache (448 and 450). Crossbar switch and logic 424 enables high-speed data communication between the lower-half compute elements of compute element array 410 and data caches 428 and 430 using access buffers 426. Crossbar switch and logic 444 enables high-speed data communication between the upper-half compute elements of compute element array 410 and data caches 448 and 450 using access buffers 446. The access buffers 426 and 446 allow logic 424 and logic 444, respectively, to hold load or store data until any memory hazards are resolved. In addition, splitting the data cache between physically adjacent regions of the compute element array can enable the doubling of load access bandwidth, the reducing of interconnect complexity, and so on. While loads can be split, stores can be driven to both lower data caches 428 and 430 and upper data caches 448 and 450.

The system block diagram 400 can include lower load buffers 422 and upper load buffers 442. The load buffers can provide temporary storage for memory load data so that it is ready for low load latency access by the compute element array 410. The system block diagram can include dual level 1 (L1) data caches, such as L1 data caches 428 and 448. The L1 data caches can be used to hold blocks of load and/or store data, such as data to be processed together, data to be processed sequentially, and so on. The L1 cache can include a small, fast memory that is quickly accessible by the compute elements and other components. The system block diagram can include level 2 (L2) data caches. The L2 caches can include L2 caches 430 and 450. The L2 caches can include larger, slower storage in comparison to the L1 caches. The L2 caches can store “next up” data, results such as intermediate results, and so on. The L1 and L2 caches can further be coupled to level 3 (L3) caches. The L3 caches can include L3 caches 416 and 418. The L3 caches can be larger than the L2 and L1 caches and can include slower storage. Accessing data from L3 caches is still faster than accessing main storage. In embodiments, the L1, L2, and L3 caches can include 4-way set associative caches.

The system block diagram 400 can include lower multiplier element 420 and upper multiplier element 440. The multiplier elements can provide an efficient multiplication function of data coming out of the compute element array and/or data moving into the compute element array. Multiplier element 420 can be coupled to the compute element array 410 and load buffers 422, and multiplier element 440 can be coupled to compute element array 410 and load buffers 442.

The system block diagram 400 can include a system management buffer 478. The system management buffer 478 can be used to store system management codes or control words that can be used by a control unit such as 471, to control the array 410 of compute elements. In some embodiments, multiple control units may be used for simultaneous configuration of multiple compute elements within compute element array 410. The system management buffer 478 can be employed for holding opcodes, codes, routines, functions, etc. which can be used for exception or error handling, management of the parallel architecture for processing tasks, and so on. The system management buffer can be coupled to a decompressor 472, which can be coupled to a compressed control word store such as compressed control word cache 1 (CCWC1) 474. CCWC1 474 can include a cache such as an L1 cache that includes one or more compressed control words. CCWC1 474 can be coupled to a further compressed control word store such as compressed control word cache 2 (CCWC2) 476. CCWC2 476 can be used as an L2 cache for compressed control words. The decompressor can be used to decompress control words (CCWs) and can store the decompressed system management control words in the system management buffer 478. The compressed system management control words can require less storage than the uncompressed control words. The system management buffer 478 can also interface with shadow SRAM 412 for saving of architectural state information to support efficient context switching, as well as having the capability of altering an architectural state in the shadow SRAM 412, and then restoring the architectural state back into the compute elements and/or other elements within the system depicted in system block diagram 400. Thus, in embodiments, the shadow SRAM is programmable. In some embodiments, the shadow SRAM stores a second shadow state. In some embodiments, the shadow SRAM stores multiple architectural states. The multiple architectural states can be stored in a queued data structure such as a FIFO, to enable loading and restoring of multiple architectural states during development and/or debugging of a program or compute task.

The compute elements within the array of compute elements can be controlled by a control unit such as control unit 460. While the compiler, through the control word, controls the individual elements, the control unit can pause the array to ensure that new control words are not driven into the array. The control unit 460 can receive a decompressed control word from a decompressor 462 and can drive out the decompressed control word into the appropriate compute elements of compute element array 410. The decompressor can decompress a control word (discussed below) to enable or idle rows or columns of compute elements, to enable or idle individual compute elements, to transmit control words to individual compute elements, etc. The decompressor can be coupled to a compressed control word store such as compressed control word cache 1 (CCWC1) 464. CCWC1 464 can include a cache such as an L1 cache that includes one or more compressed control words. CCWC1 464 can be coupled to a further compressed control word store such as compressed control word cache 2 (CCWC2) 466. CCWC2 466 can be used as an L2 cache for compressed control words. CCWC2 466 can be larger and slower than CCWC1 464.

Various elements of the system depicted in system block diagram 400 include shadow state registers, indicated as "SR" 470. The shadow state registers can be used to transfer data to and from a shadow SRAM 412. In embodiments, a shadow ring bus is used to transfer data from shadow state registers 470 to shadow SRAM 412. In embodiments, the shadow ring bus has the same width (e.g., 64 bits, 128 bits, 512 bits, etc.) as the shadow SRAM. In embodiments, a width of the shadow ring bus is based on switch latency. In general, there is a tradeoff between width and latency. A wider width reduces latency, but requires more gates on the integrated circuit (IC) that implements the array of compute elements. Similarly, a narrower width increases latency, but requires fewer gates on the integrated circuit (IC) that implements the array of compute elements. The design choice can depend on factors such as application, power requirements, size requirements, cost requirements, and/or other requirements. In embodiments, the control word is saved within the plurality of shadow state registers.

Figure 5:
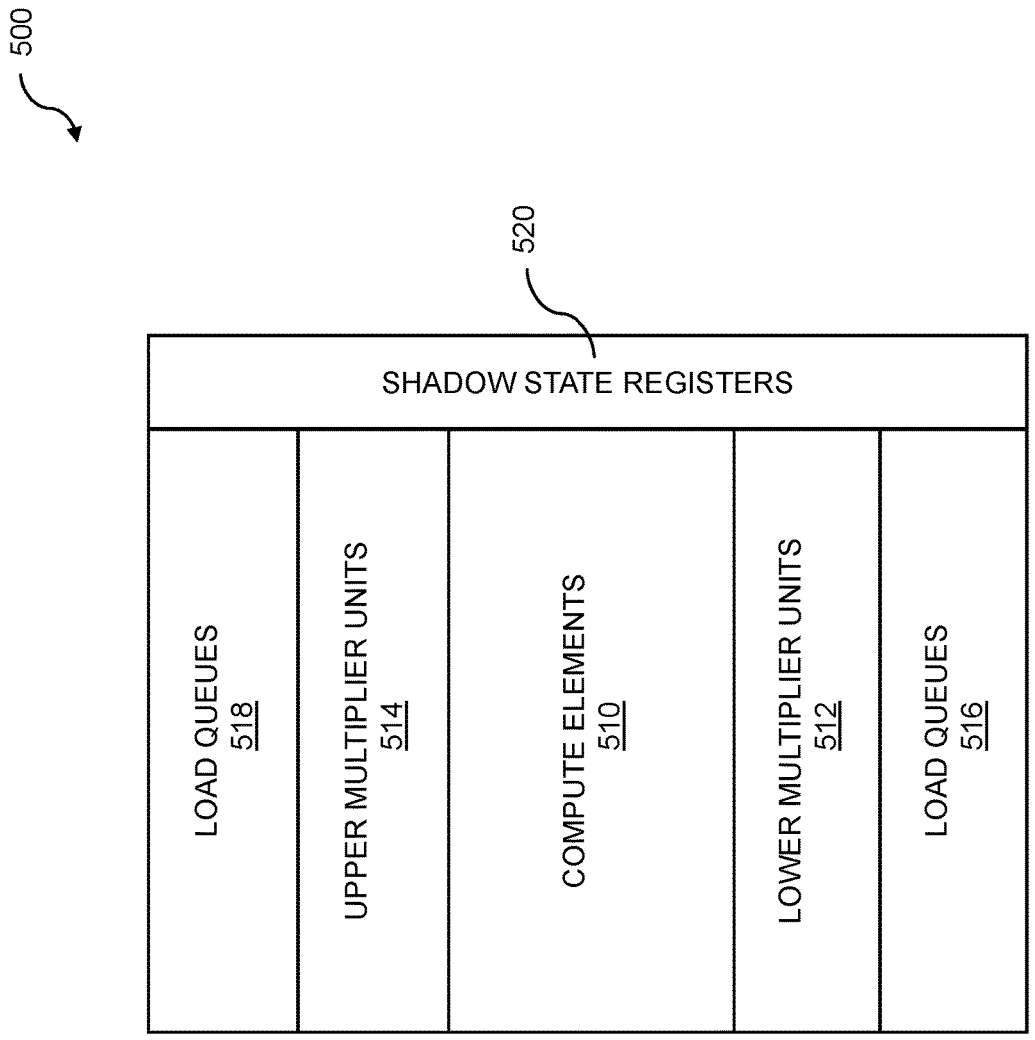
FIG. 5 shows a compute element detail with shadow state.

FIG. 5 shows a compute element detail with shadow state. A system 500, such as an SoC, can include a compute element array that can be coupled to components which enable the compute elements within the array of compute elements to process one or more tasks, subtasks, switch blocks, and so on. The components can access and provide data, perform specific high-speed operations, and the like. The components can be configured into a variety of computational topologies. The compute element array and its associated components enable parallel processing with switch block execution. The array of compute elements 510 can perform a variety of processing tasks, where the processing tasks can include operations such as arithmetic, vector, matrix, or tensor operations; audio and video processing operations; neural network operations; etc. The compute elements can be coupled to multiplier units such as lower multiplier units 512 and upper multiplier units 514. The multiplier units can be used to perform high-speed multiplications associated with general processing tasks, multiplications associated with neural networks such as deep learning networks, multiplications associated with vector operations, and the like. The compute elements can be coupled to load buffers such as load queues 516 and load queues 518. The load buffers can be coupled to the L1 data caches as discussed previously. In embodiments, a crossbar switch (not shown) can be coupled between the load buffers and the data caches. The load buffers can be used to load storage access requests from the compute elements. The load buffers can track expected load latencies and can notify a control unit if a load latency exceeds a threshold. Notification of the control unit can be used to signal that a load may not arrive within an expected timeframe. The load buffers can further be used to pause the array of compute elements. The load buffers can send a pause request to the control unit that will pause the entire array, while individual elements can be idled under control of the control word. When an element is not explicitly controlled, it can be placed in the idle (or low power) state. No operation is performed, but shadow ring buses can continue to operate in a "pass thru" mode to allow the rest of the array to operate properly. When a compute element is used just to route data unchanged through its ALU, it is still considered active.

While the array of compute elements is paused, background loading of the array from the memories (data memory and control word memory, and/or shadow SRAM) can be performed. The memory systems can be free running and can continue to operate while the array is paused. Because multi-cycle latency can occur due to control signal transport that results in additional "dead time", allowing the memory system to "reach into" the array and to deliver load data to appropriate scratchpad memories can be beneficial while the array is paused. This mechanism can operate such that the array state is known, as far as the compiler is concerned. When array operation resumes after a pause, new load data will have arrived at a scratchpad, as required for the compiler to maintain the statically scheduled model.

Each of the compute elements 510, load queues 516 and 518, and multiplier units 512 and 514 can be coupled to shadow state registers 520. In embodiments, the shadow state registers are in a memory mapped peripheral register region that is only available in a system (supervisor) mode of operation, and is not available from user mode. In embodiments, the shadow SRAM is programmatically accessible from a system mode of the processing unit via an interrupt. In embodiments, the interrupt is generated by the processing unit. In some embodiments, the interrupt is generated by external logic from the processing unit. In embodiments, shadow SRAM logic prevents processing unit access to the shadow SRAM. Note that multiplier units 512 and 514 can comprise various multicycle elements, beyond just a multiplication element. That is, they can take the form of processing elements that perform any operation that requires more than one cycle or even an indeterminate number of cycles, such as a square root operation.

Figure 6:
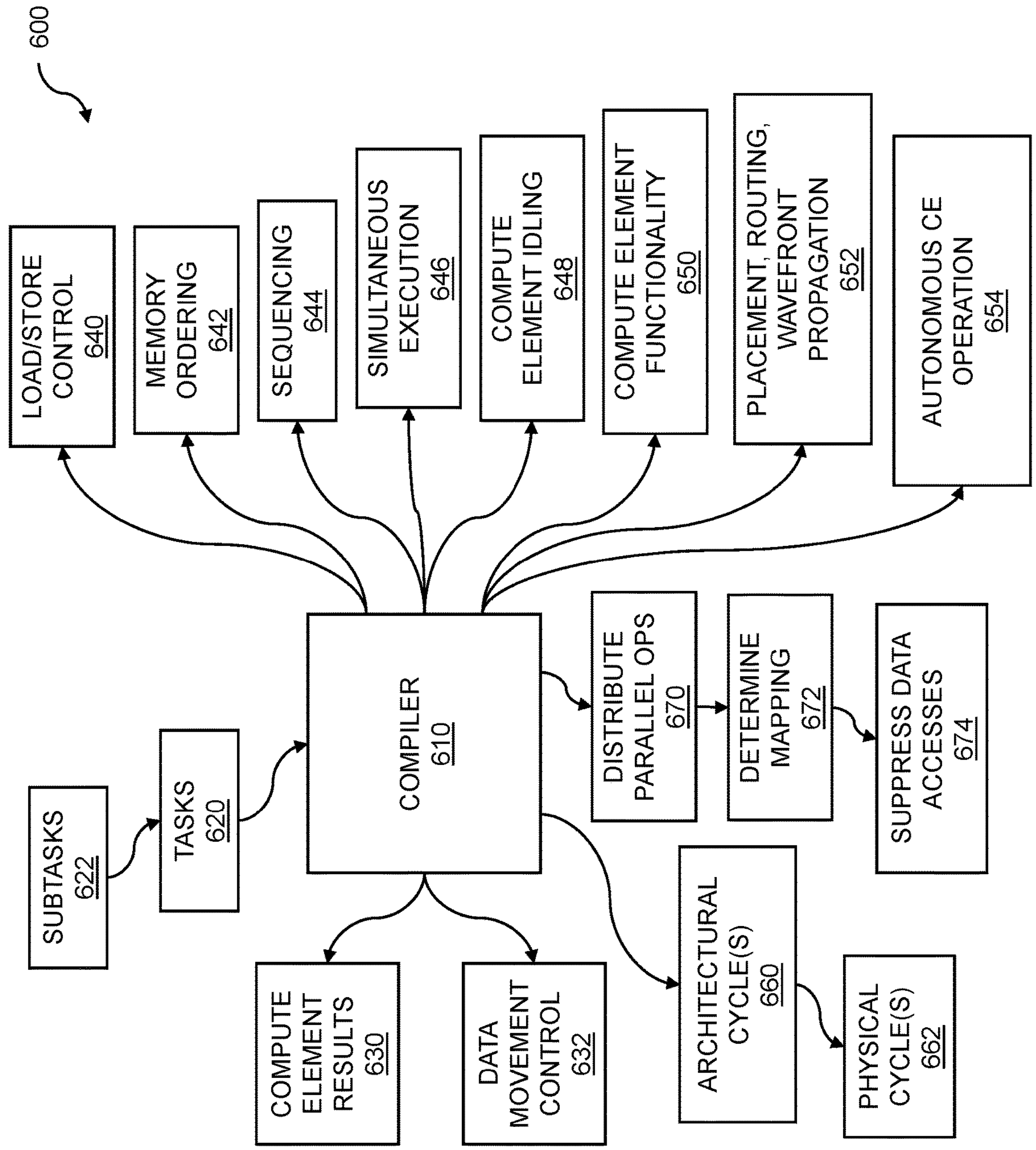
FIG. 6 is a system block diagram for compiler interactions.

FIG. 6 is a system block diagram for compiler interactions. Discussed throughout, compute elements within an array are known to a compiler which can compile processes, tasks, subtasks, and so on for execution on the array. The compiled tasks, subtasks, etc. comprise operations which can be executed on one or more compute elements within the array. The compiled tasks and subtasks are executed to accomplish task processing. The task processing can be accomplished based on parallel processing of the tasks and subtasks. Processing the tasks and subtasks includes accessing memory such as data memory, a cache, a scratchpad memory, etc. The memory accesses can cause memory access hazards if the memory accesses are not carefully orchestrated. A variety of interactions, such as placement of tasks, routing of data, and so on, can be associated with or generated by the compiler. The compiler interactions enable a parallel processing architecture for branch path suppression. An array of compute elements is accessed, wherein each compute element within the array of compute elements is known to a compiler and is coupled to its neighboring compute elements within the array of compute elements. Control for the compute elements is provided on a cycle-by-cycle basis, wherein control is enabled by a stream of wide control words generated by the compiler. A plurality of compute elements is mapped within the array of compute elements, wherein the mapping distributes parallelized operations to the plurality of compute elements, wherein the mapping is determined by the compiler, and wherein a column of compute elements within the plurality of compute elements is enabled to perform vertical data access suppression and a row of compute elements is enabled to perform horizontal data access suppression. Both sides of the branch are executed in the array of compute elements, wherein the executing includes making a branch decision. Data accesses produced by a branch operation are suppressed, based on the branch decision and an invalid indication, wherein the invalid indication is propagated among two or more of the compute elements.

The system block diagram 600 includes a compiler 610. The compiler can include a high-level compiler such as a C, C++, Python, or similar compiler. The compiler can include a compiler implemented for a hardware description language such as a VHDL™ or Verilog™ compiler. The compiler can include a compiler for a portable, language-independent, intermediate representation such as a low-level virtual machine (LLVM) intermediate representation (IR). The compiler can generate a set of directions that can be provided to the compute elements and other elements within the array. The compiler can be used to compile tasks 620. The tasks can include a plurality of tasks associated with a processing task. The tasks can further include a plurality of subtasks 622. The tasks can be based on an application such as a video processing or audio processing application. In embodiments, the tasks can be associated with machine learning functionality. The compiler can generate directions for handling compute element results 630. The compute element results can include results derived from arithmetic, vector, array, and matrix operations; Boolean operations; and so on. In embodiments, the compute element results are generated in parallel in the array of compute elements. Parallel results can be generated by compute elements, where the compute elements can share input data, use independent data, and the like. The compiler can generate a set of directions that controls data movement 632 for the array of compute elements. The control of data movement can include movement of data to, from, and among compute elements within the array of compute elements. The control of data movement can include loading and storing data, such as temporary data storage, during data movement. In other embodiments, the data movement can include intra-array data movement.

As with a general-purpose compiler used for generating tasks and subtasks for execution on one or more processors, the compiler 610 can provide directions for task and subtask handling, input data handling, intermediate and resultant data handling, and so on. The directions can include one or more operations, where the one or more operations can be executed by one or more compute elements within the array of compute elements. The compiler can further generate directions for configuring the compute elements, storage elements, control units, ALUs, and so on associated with the array. As previously discussed, the compiler generates directions for data handling to support the task handling. The directions can further enable spatially adjacent mapping of compute elements to support switch block execution. In embodiments, spatially adjacent mapping can be determined at compile time by the compiler. In the system block diagram, the data movement can include loads and stores 640 with a memory array. The loads and stores can include handling various data types such as integer, real or float, double-precision, character, and other data types. The loads and stores can load and store data into local storage such as registers, register files, caches, and the like. The caches can include one or more levels of cache such as a level 1 (L1) cache, a level 2 (L2) cache, a level 3 (L3) cache, and so on. The loads and stores can also be associated with storage such as shared memory, distributed memory, etc. In addition to the loads and stores, the compiler can handle other memory and storage management operations including memory precedence. In the system block diagram, the memory access precedence can enable ordering of memory data 642. Memory data can be ordered based on task data requirements, subtask data requirements, and so on. The memory data ordering can enable parallel execution of tasks and subtasks.

In the system block diagram 600, the ordering of memory data can enable compute element result sequencing 644. In order for task processing to be accomplished successfully, tasks and subtasks must be executed in an order that can accommodate task priority, task precedence, a schedule of operations, and so on. The memory data can be ordered such that the data required by the tasks and subtasks can be available for processing when the tasks and subtasks are scheduled to be executed. The results of the processing of the data by the tasks and subtasks can therefore be ordered to optimize task execution, to reduce or eliminate memory contention conflicts, etc. The system block diagram includes enabling simultaneous execution 646 of two or more potential compiled task outcomes based on the set of directions. The code that is compiled by the compiler can include branch points, where the branch points can include computations or flow control. Flow control transfers program execution to a different sequence of control words. Since the result of a branch decision, for example, is not known a priori, the initial operations associated with both paths are encoded in the currently executing control word stream. When the correct result of the branch is determined, then the sequence of control words associated with the correct branch result continues execution, while the operations for the branch path not taken are halted and side effects may be flushed. In embodiments, the two or more potential branch paths can be executed on spatially separate compute elements within the array of compute elements.

The system block diagram includes compute element idling 648. In embodiments, the set of directions from the compiler can idle an unneeded compute element within a row of compute elements located in the array of compute elements. Not all of the compute elements may be needed for processing, depending on the tasks, subtasks, and so on that are being processed. The compute elements may not be needed simply because there are fewer tasks to execute than there are compute elements available within the array. In embodiments, the idling can be controlled by a single bit in the control word generated by the compiler. In the system block diagram, compute elements within the array can be configured for various compute element functionalities 650. The compute element functionality can enable various types of compute architectures, processing configurations, and the like. In embodiments, the set of directions can enable machine learning functionality. The machine learning functionality can be trained to process various types of data such as image data, audio data, medical data, etc. In embodiments, the machine learning functionality can include a neural network implementation.

The neural network can include a convolutional neural network, a recurrent neural network, a deep learning network, and the like. The system block diagram can include compute element placement, results routing, and computation wave-front propagation 652 within the array of compute elements. The compiler can generate directions that can place tasks and subtasks on compute elements within the array. The placement can include placing tasks and subtasks based on data dependencies between or among the tasks or subtasks, placing tasks that avoid memory conflicts or communications conflicts, etc. The directions can also enable computation wave-front propagation. Computation wave-front propagation can implement and control how execution of tasks and subtasks proceeds through the array of compute elements. The system block diagram 600 can include autonomous compute element (CE) operation 654. As described throughout, autonomous CE operation enables one or more operations to occur outside of direct control word management.

In the system block diagram, the compiler can control architectural cycles 660. An architectural cycle can include an abstract cycle that is associated with the elements within the array of elements. The elements of the array can include compute elements, storage elements, control elements, ALUs, and so on. An architectural cycle can include an "abstract" cycle, where an abstract cycle can refer to a variety of architecture level operations such as a load cycle, an execute cycle, a write cycle, and so on. The architectural cycles can refer to macro-operations of the architecture rather than to low level operations. One or more architectural cycles are controlled by the compiler. Execution of an architectural cycle can be dependent on two or more conditions. In embodiments, an architectural cycle can occur when a control word is available to be pipelined into the array of compute elements and when all data dependencies are met. That is, the array of compute elements does not have to wait for either dependent data to load or for a full memory buffer to clear. In the system block diagram, the architectural cycle can include one or more physical cycles 662. A physical cycle can refer to one or more cycles at the element level required to implement a load, an execute, a write, and so on. In embodiments, the set of directions can control the array of compute elements on a physical cycle-by-cycle basis. The physical cycles can be based on a clock such as a local, module, or system clock, or can be based on some other timing or synchronizing technique. In embodiments, the physical cycle-by-cycle basis can include an architectural cycle. The physical cycles can be based on an enable signal for each element of the array of elements, while the architectural cycle can be based on a global, architectural signal. In embodiments, the compiler can provide, via the control word, valid bits for each column of the array of compute elements, on the cycle-by-cycle basis. A valid bit can indicate that data is valid and ready for processing, that an address such as a jump address is valid, and the like. In embodiments, the valid bits can indicate that a valid memory load access is emerging from the array. The valid memory load access from the array can be used to access data within a memory or storage element. In other embodiments, the compiler can provide, via the control word, operand size information for each column of the array of compute elements. Various operand sizes can be used. In embodiments, the operand size can include bytes, half-words, words, and doublewords.

The system block diagram 600 includes distributing parallelized operations 670 to the plurality of compute elements. The distributing the parallelized operations is associated with mapping a plurality of compute elements. The parallelized operations can be associated with one or more processes, where the one or more processes can comprise tasks, subtasks, and so on. The parallelized operations can include one or more of memory access operations, logical operations, arithmetic operations, and so on. The operations can further include matrix operations, tensor operations, etc. The parallelized operations can be distributed to the compute elements via an interconnect, a bus, one or more communications channels, and the like. The parallelized operations can include substantially similar operations distributed to a plurality of compute elements. The substantially similar operations can process portions of data such as a dataset, different datasets, etc. In other embodiments, the parallelized operations can include substantially different operations. The substantially different operations may have no data dependencies, interoperation communications, etc., enabling the substantially different operations to be executed in parallel.

In the system block diagram 600, the compiler is used to determine the mapping 672 of the plurality of parallelized operations. The mapping can include a topology, where the topology can include a pointer chasing topology. A pointer chasing topology can be used to gauge one or more processor characteristics such as processing rate, to measure memory access bandwidth and latencies, and the like. The mapping that can be determined by the compiler can include a column, row, grouping, region, quadrant, etc. of compute elements within the array of compute elements. Discussed previously, the compiler can include a high-level compiler such as a C, C++, Python, or similar compiler; a compiler implemented for a hardware description language such as a VHDL™ or Verilog™ compiler; a compiler for a portable, language-independent, intermediate representation such as a low-level virtual machine (LLVM) intermediate representation (IR), etc. The compiler can determine the mapping of the compute elements based on tasks, subtasks, and the like to be executed. The mapping can be determined by the compiler while memory access latency remains unknown to the compiler at compile time. The memory access latency is unknown at compile time because the memory access latency is dependent on which operations are executing on one or more compute elements when a memory access operation is executed. Further, memory access latency can be dependent on bus latency, crossbar switch transit latency, etc.

The system block diagram 600 includes data access suppression 674. The data access suppression can include suppression of operations such as memory access operations associated with one or more untaken branch paths. The memory access operations can include access to cache memory, local memory, shared memory, etc. In embodiments, the invalid indication can suppress loading and/or storing data in the data cache. Recall that prior to a branch decision being determined, operations associated with each branch path can be executed in parallel. When the branch decision is determined, then operations associated with the one or more untaken paths can be suppressed. In embodiments, a column of compute elements within the plurality of compute elements is enabled to perform vertical data access suppression and a row of compute elements is enabled to perform horizontal data access suppression. In addition to the branch decision, the suppressing can further be based on a flag, a signal, and so on, which can be generated by a control element. In embodiments, the data accesses produced by a branch operation are suppressed, based on the branch decision and an invalid indication. The invalid indication can be associated with an untaken branch path, a data-not-ready state, and the like. The invalid indication can be shared among compute elements within a column, a row, and the like. In embodiments, the invalid indication can be propagated among two or more of the compute elements. The two or more compute elements can be found within a row, a column, etc. The suppressing loading and/or storing of data can be disabled when one or more conditions that occurred to cause the suppression have ended, been corrected, etc. In embodiments, the suppressing can be disabled by resetting the invalid indication.

Figure 7:
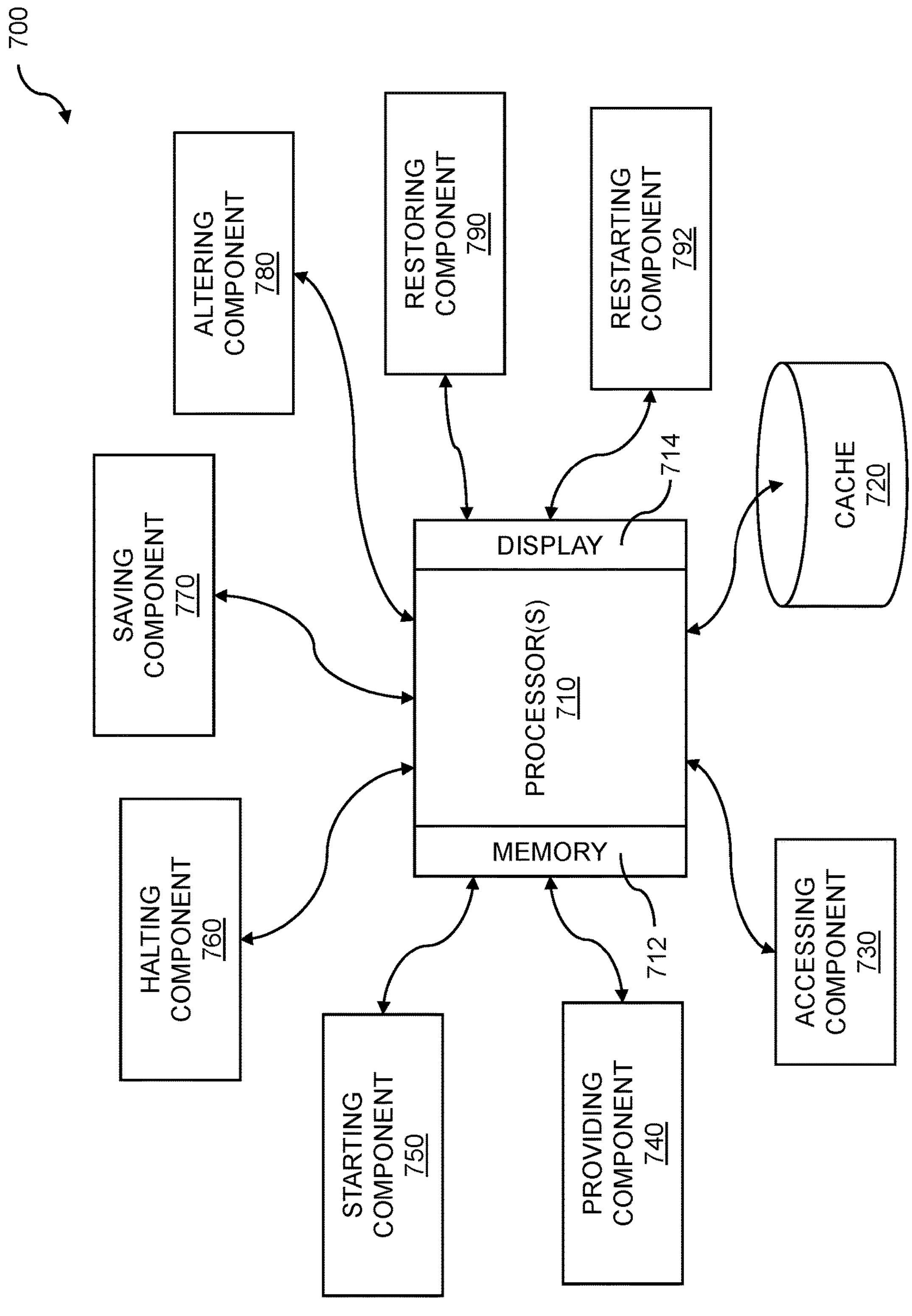
FIG. 7 is a system diagram for a parallel processing architecture with a shadow state.

FIG. 7 is a system diagram for a parallel processing architecture with a shadow state. The system 700 can include one or more processors 710, which are coupled to a memory 712 which stores instructions. The system 700 can further include a display 714 coupled to the one or more processors 710 for displaying data such as compute element maps; architectural states; indications such as valid indications; address tags; intermediate steps; directions; compressed control words; fixed-length control words; control words implementing Very Long Instruction Word (VLIW) functionality; topologies including systolic, vector, cyclic, spatial, streaming, or VLIW topologies; and so on. In embodiments, one or more processors 710 are coupled to the memory 712, wherein the one or more processors, when executing the instructions which are stored, are configured to implement disclosed embodiments. The stream of wide control words can include a plurality of compressed control words. The plurality of compressed control words is decompressed by hardware associated with the array of compute elements and is driven into the array. The plurality of compressed control words is decompressed into fixed-length control words that comprise one or more compute element operations. The compute element operations are executed within the array of compute elements. The compute elements can include compute elements within one or more integrated circuits or chips; compute elements or cores configured within one or more programmable chips such as application specific integrated circuits (ASICs); field programmable gate arrays (FPGAs); heterogeneous processors configured as a mesh; standalone processors; etc.

The system 700 can include a cache 720. The cache 720 can be used to store data such as operations associated with two or more sides associated with a branch operation. In embodiments, the data can include a mapping of a plurality of compute elements. The mapping can distribute parallelized operations to the plurality of compute elements. The cache can further be used to store precedence information; directions to compute elements; decompressed, fixed-length control words; compute element operations associated with decompressed control words; intermediate results; microcode; branch decisions; and so on. The cache can comprise a small, local, easily accessible memory available to one or more compute elements. The data that is stored within the cache can include the precedence information which enables hardware ordering of memory access loads to the array of compute elements and memory access stores from the array of compute elements. The precedence information can provide semantically correct operation ordering. The data that is stored within the cache can further include linking information; compressed control words; decompressed, fixed-length control words; etc. Embodiments include storing relevant portions of a control word within the cache associated with the array of compute elements. The cache can be accessible to one or more compute elements. The cache, if present, can include a dual read, single write (2R1W) cache. That is, the 2R1W cache can enable two read operations and one write operation contemporaneously without the read and write operations interfering with one another. The cache can be coupled to operate in cooperation with, etc. scratchpad storage. The scratchpad storage can include a small, fast, local memory element coupled to one or more compute elements. In embodiments, the scratchpad storage can act as a "level zero" or L0 cache within a multi-level cache storage hardware configuration.

The system 700 can include an accessing component 730. The accessing component 730 can include control logic and functions for accessing an array of compute elements. Each compute element within the array of compute elements is known to a compiler and is coupled to its neighboring compute elements within the array of compute elements. A compute element can include one or more processors, processor cores, processor macros, and so on. Each compute element can include an amount of local storage such as local cache, shared cache, etc. The local storage may be accessible to one or more compute elements. Each compute element can communicate with neighboring compute elements (neighbors), where the neighbors can include nearest neighbors or more remote neighbors. Communication between and among compute elements can be accomplished using a bus such as an industry standard bus, a shadow ring bus, a network such as a wired or wireless computer network, etc. In embodiments, the shadow ring bus is implemented as a distributed multiplexor (MUX).

The system 700 can include a providing component 740. The providing component 740 can include control and functions for providing control for the compute elements on a cycle-by-cycle basis, wherein control is enabled by a stream of wide control words generated by the compiler, and wherein the control includes a branch. The plurality of control words enables compute element configuration and operation execution, compute element memory access, inter-compute element communication, etc., on a cycle-by-cycle basis. The control words can further include variable bit-length control words, compressed control words, and so on. The control words can be based on low-level control words such as assembly language words, microcode words, firmware words, and so on. In embodiments, the stream of wide, variable length control words generated by the compiler provides direct fine-grained control of the 2D array of compute elements. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies, such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. The control can enable machine learning functionality for the neural network topology. The branch can include a branch decision, where the branch decision can be determined based on a logical function, an arithmetic computation, and the like.

The control of the array of compute elements on a cycle-by-cycle basis can include configuring the array to perform various compute operations. In embodiments, the stream of wide control words generated by the compiler provides direct fine-grained control of the 2D array of compute elements. The fine-grained control can include individually controlling each compute element, irrespective of type of compute element. A compute element type can include an integer, floating-point, address generation, write buffer, or read buffer element, etc. The compute operations can include a read-modify-write operation. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies, such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a network topology such as a neural network topology, a Petri Net topology, etc. A control can enable machine learning functionality for the neural network topology.

In embodiments, the control word from the stream of wide control words can include a source address, a target address, a block size, and a stride. The target address can include an absolute address, a relative address, an indirect address, and so on. The block size can be based on a logical block size, a physical memory block size, and the like. In embodiments, the memory block transfer control logic can compute memory addresses. The memory addresses can be associated with memory coupled to the 2D array of compute elements, shared memory, a memory system, etc. Further embodiments can include using memory block transfer control logic. The memory block transfer control logic can include one or more dedicated logic blocks, configurable logic, etc. In embodiments, the memory block transfer control logic can be implemented outside of the 2D array of compute elements. The transfer control logic can include a logic element coupled to the 2D array. In other embodiments, the memory block transfer control logic can operate autonomously from the 2D array of compute elements. In a usage example, a control word that includes a memory block transfer request can be provided to the memory block transfer control logic. The logic can execute the memory block transfer while the 2D array of compute elements is processing control words, executing compute element operations, and the like. In other embodiments, the memory block transfer control logic can be augmented by configuring one or more compute elements from the 2D array of compute elements. The compute elements from the 2D array can provide interfacing operations between compute elements within the 2D array and the memory block transfer control logic. In other embodiments, the configuring can initialize compute element operation buffers within the one or more compute elements. The compute element operation buffers can be used to buffer control words, decompressed control words, portions of control words, etc. In further embodiments, the operation buffers can include bunch buffers. Control words are based on bits. Sets of control word bits, called bunches, can be loaded into buffers called bunch buffers. The bunch buffers are coupled to compute elements and can control the compute elements. The control word bunches are used to configure the 2D array of compute elements, and to control the flow or transfer of data within and the processing of the tasks and subtasks on the compute elements within the array.

The control words that are generated by the compiler can further include a conditionality such as a branch. In embodiments, the control words can include branch operations. The branch can include a conditional branch, an unconditional branch, etc. The control words can be decompressed by a decompressor logic block that decompresses words from a compressed control word cache on their way to the array. In embodiments, the set of directions can include a spatial allocation of subtasks on one or more compute elements within the array of compute elements. In other embodiments, the set of directions can enable multiple, simultaneous programming loop instances circulating within the array of compute elements. The multiple programming loop instances can include multiple instances of the same programming loop, multiple programming loops, etc.

The system 700 can include a starting component 750. The starting component 750 can include control and functions for starting execution of a compiled task on the 2D array, based on the set of directions, wherein the set of directions enables the 2D array to properly sequence compute element results. The tasks can accomplish a variety of processing objectives such as application processing, data manipulation, and so on. The tasks can operate on a variety of data types including integer, real, and character data types; vectors and matrices; etc. The starting can include resetting the system, which puts the system in a halted state, and then setting a start address and a jump register in the shadow SRAM, and then performing a context switch that causes loading the shadow SRAM contents into the active processor state.

The system 700 can include a halting component 760. The halting component 760 can include control and functions for halting execution of the compiled task at a point in time. In embodiments, the halting can be based on a software condition, such as an exception, software task termination, a page fault, and the like. In embodiments, the halting can be based on a hardware condition such as assertion of a GPIO (General Purpose Input/Output) signal, and/or other hardware conditions. In embodiments, the halting can be based on an external host, such as a Linux workstation that is controlling the system that includes the array of compute elements. In embodiments, the halting is accomplished simultaneously for all compute elements.

The system 700 can include a saving component 770. The saving component 770 can include control and functions for saving an architectural state, at the point of the halting, of the 2D array into a shadow SRAM. In embodiments, the system that includes the array of compute elements is superstatic, indicating that pipelining registers are part of the architectural state that the compiler targets. Thus, in embodiments, the saving is performed simultaneously for all compute elements in order to preserve the state of the entire system in sync. In embodiments, the saving component 770 can perform the steps of loading the shadow SRAM, wherein the shadow SRAM comprises one or more rows, wherein the loading includes a unique data value for each of the one or more rows, and wherein the loading is based on the length of the shadow ring bus.

The system 700 can include an altering component 780. The altering component 780 can include control and functions for altering, within the shadow SRAM, a bit representing a portion of the architectural state of the 2D array. The altering can include changing the Boolean state of one or more bits within the shadow SRAM. The bits can correspond to register values and/or memory content values within a compute element. The bits can correspond to register values and/or configurations of other elements within the system, such as a memory system, control unit, and/or other elements within the system.

The system 700 can include a restoring component 790. The restoring component 790 can include control and functions for restoring to the 2D array the architectural state of the 2D array that was altered within the shadow SRAM. The restoring can include transferring architectural state data stored in the shadow SRAM to the system. In embodiments the restoring utilizes a shadow ring bus that couples the shadow SRAM to various elements that can include compute elements, control units, memory systems, DMA controllers, interrupt controllers, cache controllers, floating-point units (FPUs), arithmetic logic units (ALUs), and/or other associated elements. In embodiments, the restoring is accomplished simultaneously for all compute elements. In embodiments, the restoring further comprises setting state registers for a control unit. The control unit can include state registers for controlling the 2D array of compute elements. The state registers can include a start address and a jump register.

The system 700 can include a restarting component 792. The restarting component 792 can include control and functions for restarting the execution of the compiled task in the architectural state that was altered. In embodiments, the restarting occurs based on the setting of a start address and a jump register in the shadow SRAM, which causes the system that includes the array of compute elements to restart task execution using the altered architectural state.

The system 700 can include a computer program product embodied in a non-transitory computer readable medium for task processing, the computer program product comprising code which causes one or more processors to perform operations of: accessing a processing unit comprising a two-dimensional (2D) array of compute elements, a control unit, and a memory system, wherein each compute element within the 2D array of compute elements is known to a compiler and is coupled to its neighboring compute elements within the array of compute elements, and wherein the control unit, memory system, and each compute element within the 2D array of compute elements includes a plurality of shadow state registers; providing a set of directions to the 2D array, through a control word generated by the compiler, for compute element operation and memory access precedence; starting execution of a compiled task on the 2D array, based on the set of directions, wherein the set of directions enables the 2D array to properly sequence compute element results; halting execution of the compiled task at a point in time; saving an architectural state, at the point of the halting, of the 2D array into a shadow SRAM; altering, within the shadow SRAM, a bit representing a portion of the architectural state of the 2D array; restoring, to the 2D array, the architectural state of the 2D array that was altered within the shadow SRAM; and restarting execution of the compiled task in the architectural state that was altered.

The system 700 can include a computer system for task processing comprising: a memory which stores instructions; one or more processors coupled to the memory wherein the one or more processors, when executing the instructions which are stored, are configured to: access a processing unit comprising a two-dimensional (2D) array of compute elements, a control unit, and a memory system, wherein each compute element within the 2D array of compute elements is known to a compiler and is coupled to its neighboring compute elements within the array of compute elements, and wherein the control unit, memory system, and each compute element within the 2D array of compute elements includes a plurality of shadow state registers; provide a set of directions to the 2D array, through a control word generated by the compiler, for compute element operation and memory access precedence; start execution of a compiled task on the 2D array, based on the set of directions, wherein the set of directions enables the 2D array to properly sequence compute element results; halt execution of the compiled task at a point in time; save an architectural state, at the point of the halting, of the 2D array into a shadow SRAM; alter, within the shadow SRAM, a bit representing a portion of the architectural state of the 2D array; restore, to the 2D array, the architectural state of the 2D array that was altered within the shadow SRAM; and restart execution of the compiled task in the architectural state that was altered.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for task processing comprising:

accessing a processing unit comprising a two-dimensional (2D) array of compute elements, a control unit, and a memory system, wherein each compute element within the 2D array of compute elements is known to a compiler and is coupled to its neighboring compute elements within the 2D array of compute elements, and wherein the control unit, memory system, and each compute element within the 2D array of compute elements includes a plurality of shadow state registers;

providing a set of directions to the 2D array, through a control word generated by the compiler, for compute element operation and memory access precedence;

starting execution of a compiled task on the 2D array, based on the set of directions, wherein the set of directions enables the 2D array to properly sequence compute element results;

halting execution of the compiled task at a point in time;

saving an architectural state, at the point of the halting, of the 2D array into a shadow SRAM;

altering, within the shadow SRAM, a bit representing a portion of the architectural state of the 2D array, wherein the altering further comprises determining an address, within the shadow SRAM, of specific shadow information;

restoring, to the 2D array, the architectural state of the 2D array that was altered within the shadow SRAM; and restarting execution of the compiled task in the architectural state that was altered.

2. The method of claim 1 further comprising computing a length of a shadow ring bus, wherein the computing is based on an instrumented RTL model of the processing unit with at least one observation port.

3. The method of claim 2 wherein a width of the shadow ring bus is based on switch latency.

4. The method of claim 3 wherein the shadow SRAM is comprised of a number of rows equivalent to a length of the shadow ring bus.

5. The method of claim 2 further comprising simulating the instrumented RTL model, wherein the simulating includes placing one or more tracer values into the shadow ring bus.

6. The method of claim 5 further comprising counting a number of cycles until the one or more tracer values are detected in the at least one observation port.

7. The method of claim 2 further comprising loading the shadow SRAM, wherein the shadow SRAM comprises one or more rows, wherein the loading includes a unique data value for each of the one or more rows, and wherein the loading is based on the length of the shadow ring bus.

8. The method of claim 7 further comprising snooping, in the instrumented RTL model, a register of interest, wherein the snooping reveals the unique data value that was loaded corresponding to a row in the shadow SRAM.

9. The method of claim 8 wherein single bit values are detected using a sequence of values and snooping the sequence.

10. The method of claim 1 further comprising controlling the saving and restoring with a shadow state master logic.

11. The method of claim 10 wherein the shadow state master logic is coupled to the plurality of shadow state registers via a shadow ring bus.

12. The method of claim 1 wherein the control word is saved within the plurality of shadow state registers.

13. The method of claim 1 wherein the halting and/or the restoring are accomplished simultaneously for all compute elements.

14. The method of claim 13 wherein the restoring further comprises setting state registers for a control unit.

15. The method of claim 14 wherein the state registers include a start address and a jump register.

16. The method of claim 1 wherein the shadow SRAM is programmatically accessible from a system mode of the processing unit via an interrupt.

17. The method of claim 16 wherein the interrupt is generated by the processing unit or logic external from the processing unit.

18. The method of claim 1 wherein shadow SRAM logic prevents processing unit access to the shadow SRAM.

19. The method of claim 1 wherein the shadow SRAM stores a second shadow state.

20. The method of claim 1 further comprising enabling the saving and restoring with an interrupt.

21. The method of claim 1 wherein the saving further comprises storing an architectural state of the control unit.

22. The method of claim 21 wherein the altering and restoring include the architectural state of the control unit.

23. The method of claim 1 wherein the saving further comprises storing an architectural state of the memory system, and wherein the altering and the restoring include the architectural state of the memory system.

24. A computer program product embodied in a non-transitory computer readable medium for task processing, the computer program product comprising code which causes one or more processors to perform operations of:

accessing a processing unit comprising a two-dimensional (2D) array of compute elements, a control unit, and a memory system, wherein each compute element within the 2D array of compute elements is known to a compiler and is coupled to its neighboring compute elements within the 2D array of compute elements, and wherein the control unit, memory system, and each compute element within the 2D array of compute elements includes a plurality of shadow state registers;

providing a set of directions to the 2D array, through a control word generated by the compiler, for compute element operation and memory access precedence;

starting execution of a compiled task on the 2D array, based on the set of directions, wherein the set of directions enables the 2D array to properly sequence compute element results;

halting execution of the compiled task at a point in time;

saving an architectural state, at the point of the halting, of the 2D array into a shadow SRAM;

altering, within the shadow SRAM, a bit representing a portion of the architectural state of the 2D array, wherein the altering further comprises determining an address, within the shadow SRAM, of specific shadow information;

restoring, to the 2D array, the architectural state of the 2D array that was altered within the shadow SRAM; and restarting execution of the compiled task in the architectural state that was altered.

25. A computer system for task processing comprising:

a memory which stores instructions;

one or more processors coupled to the memory, wherein the one or more processors, when executing the instructions which are stored, are configured to:

access a processing unit comprising a two-dimensional (2D) array of compute elements, a control unit, and a memory system, wherein each compute element within the 2D array of compute elements is known to a compiler and is coupled to its neighboring compute elements within the 2D array of compute elements, and wherein the control unit, memory system, and each compute element within the 2D array of compute elements includes a plurality of shadow state registers;

provide a set of directions to the 2D array, through a control word generated by the compiler, for compute element operation and memory access precedence;

start execution of a compiled task on the 2D array, based on the set of directions, wherein the set of directions enables the 2D array to properly sequence compute element results;

halt execution of the compiled task at a point in time;

save an architectural state, at the point of halting, of the 2D array into a shadow SRAM;

alter, within the shadow SRAM, a bit representing a portion of the architectural state of the 2D array, wherein the altering further comprises determining an address, within the shadow SRAM, of specific shadow information;

restore, to the 2D array, the architectural state of the 2D array that was altered within the shadow SRAM; and restart execution of the compiled task in the architectural state that was altered.

* * * * *